S. E. FEIGE.
PNEUMATIC TIRE.
APPLICATION FILED APR. 3, 1912.
1,086,447.
Patented Feb. 10, 1914.
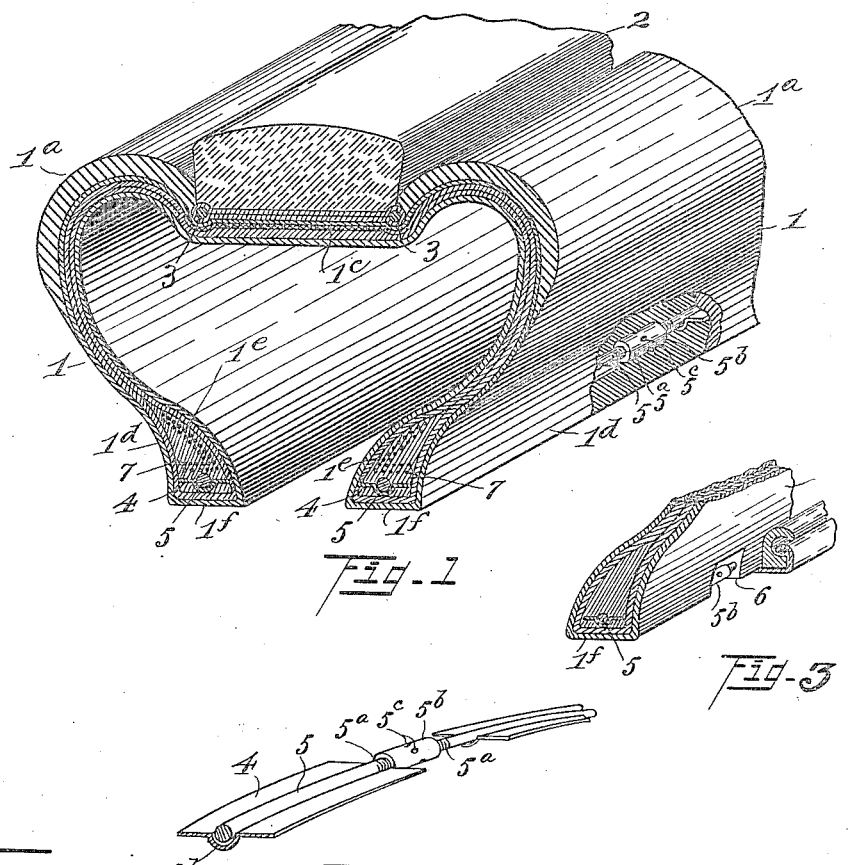

UNITED STATES PATENT OFFICE.

STERLING E. FEIGE, OF AKRON, OHIO.

PNEUMATIC TIRE.

1,086,447.

Specification of Letters Patent. Patented Feb. 10, 1914.

Application filed April 3, 1912. Serial No. 688,188.

*To all whom it may concern:*

Be it known that I, STERLING E. FEIGE, a citizen of the United States, residing at Akron, in the county of Summit and State of Ohio, have invented certain new and useful Improvements in Pneumatic Tires, of which the following is a specification.

My invention relates to improvements in pneumatic tires, and more particularly to improvements in tire casings or sheaths.

A still further object is to improve the form and construction of the base or heel portions of the tire casing, and more particularly the reinforcement of the heel members of the tire casing whereby to form an unstretchable tire base, particularly of the non-clencher type, adapted to be readily mounted upon and adjusted to fit any standard rim, and when so adjusted, adapted to be securely held in proper position at all times and to prevent creeping whether in an inflated or non-inflated condition.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a perspective view of a section of a tire casing constructed in accordance with my invention. Fig. 2, a perspective view of a section of one of the reinforcing band and tie members for reinforcing the base or heel portions of the tire casing. Fig. 3, a perspective view of a section of the heel portion of a tire and illustrating a means for adjusting the same.

Similar numerals of reference designate like parts throughout all the figures of the drawings.

The improved tire casing 1, may be of any suitable and convenient form, as for example of substantially heart-shape in cross section as shown, forming lobe-shaped members $1^a$, near the outer periphery of the casing, and having a depressed circumferentially extending portion $1^c$, adapted to receive and contain a circumferentially extending tread ring or member 2, between the lobes $1^a$, and normally extending beyond the planes of the latter when the tire is fully or properly inflated.

If desired, the tread portions of the tire casing may be reinforced by means of suitable reinforcing elements or members 3, such as rings or strands of suitable non-stretchable material as indicated, said reinforcing elements or members 3, being preferably located at the base of the tread portion 2 and within the depressed circumferentially extending portion $1^c$, of the tire casing as shown.

The tire casing may be constructed and reinforced as above described, or in some other suitable and convenient manner, and if of the non-clencher type, as shown, is preferably provided with a plurality of circumferentially extending strands $1^e$, of non-stretchable material, such as piano wire, or the like, said strands $1^e$, being preferably arranged as shown in Fig. 1, of the drawings, and for the purposes hereinafter described.

As a means for reinforcing the base or heel members $1^d$, as well as providing means for holding the flat supporting portions $1^f$, thereof in non-creeping and non-rotative contact with the subjacent rim, as well as providing means for adjusting said heel members to meet slight variations in various forms of rims, reinforcing band ring members 4, are horizontally disposed within the heel members, and in the present instance, in substantially parallel relation to the flat supporting portions $1^f$ thereof, said reinforcing bands 4, being adapted to maintain the flat portions of the heel members in substantially uniform contact with the subjacent rim and especially as against any lateral or tilting movement of the same with respect to any lateral stresses or the inclination of the heel members to become unseated.

As a means for further reinforcing the reinforcing bands 4, as well as providing means for adjusting and holding the non-stretchable base members $1^d$, in adjusted position, reinforcing ring or tie members 5, are provided, said ring members 5, being disposed above the reinforcing band members and being arranged to be adjusted in some suitable and convenient manner, as for example, by means of adjacent threaded ends $5^a$, connected by a threaded sleeve or turn buckle $5^b$, said turn buckle being adapted to be operated by a suitable implement which may be inserted in openings $5^c$, a suitable recess or slit 6, as shown in Fig. 3, being adapted to afford access to the turn buckle 5, in operating the latter.

The reinforcing bands 4, may be provided with a grooved or channeled portion $5^d$, to receive and form a seat for the superposed ring or tie members.

The heel members $1^d$, are preferably further reinforced by means of horizontally disposed strands of non-stretchable wire 7, above and in substantially parallel relation to the subjacent reinforcing band members 4, the strands $1^e$, above, being arranged in curved form, the entire arrangement of reinforcements being adapted to securely hold the heel members $1^d$, in proper relation to the rim members as well as the securing rings at the sides thereof.

From the foregoing description, taken in connection with the accompanying drawings, the operation and advantages of my invention will be readily understood.

Having thus described some of the embodiments of my invention, what I claim and desire to secure by Letters Patent is,—

1. A tire casing provided with heel members having flat base portions, channeled reinforcing bands mounted in said heel members above and parallel with said base portions, and reinforcing tie ring members seated in the channeled portions of said reinforcing bands.

2. A tire casing provided with nonclencher heel members, metallic bands mounted in said heel members and provided with channeled median portions, and reinforcing wire rings seated in said channeled median portions.

In testimony whereof I have affixed my signature in presence of two witnesses.

STERLING E. FEIGE.

Witnesses:
 SAMUEL FRIEDMAN,
 WALTER R. TALBOT.